(12) United States Patent
Matsusaka et al.

(10) Patent No.: US 9,109,497 B2
(45) Date of Patent: Aug. 18, 2015

(54) VEHICLE COOLING DEVICE

(75) Inventors: Masanobu Matsusaka, Handa (JP); Tadayoshi Sato, Chita-gun (JP); Hirohisa Takano, Handa (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 13/988,586

(22) PCT Filed: Jan. 12, 2012

(86) PCT No.: PCT/JP2012/050478
§ 371 (c)(1),
(2), (4) Date: May 21, 2013

(87) PCT Pub. No.: WO2012/108225
PCT Pub. Date: Aug. 16, 2012

(65) Prior Publication Data
US 2013/0240174 A1    Sep. 19, 2013

(30) Foreign Application Priority Data

Feb. 10, 2011 (JP) .................................. 2011-027571

(51) Int. Cl.
*F24F 11/06* (2006.01)
*B60H 1/00* (2006.01)
(Continued)

(52) U.S. Cl.
CPC ... *F01P 7/00* (2013.01); *F01P 5/12* (2013.01); *F01P 7/167* (2013.01); *F16K 15/028* (2013.01);
(Continued)

(58) Field of Classification Search
CPC .......... B60H 1/00885; F01P 3/12; F01P 3/20; F01P 7/14; F01P 7/164; F01P 7/167; F01P 2007/146; F01P 2025/08; F01P 2025/32; F01P 2031/30

USPC ............. 165/244, 246, 41, 51, 52; 123/41.01, 123/41.02, 41.03, 41.1, 41.08, 41.09, 41.29, 123/41.44, 41.72
See application file for complete search history.

(56) References Cited

U.S. PATENT DOCUMENTS 2,134,778 A  *  11/1938  Clarke ..................... 123/196 AB
2,277,113 A  *   3/1942  Kimmel ..................... 123/41.08
(Continued)

FOREIGN PATENT DOCUMENTS

DE    196 35 044 A1    3/1997
DE    102 50 157 A1    5/2003
(Continued)

OTHER PUBLICATIONS

English language translation of the International Preliminary Report on Patentability mailed Aug. 22, 2013 by the International Bureau of WIPO in International Application No. PCT/JP2012/050478 (8 pgs).

(Continued)

*Primary Examiner* — Ljiljana Ciric
(74) *Attorney, Agent, or Firm* — Buchanan Ingersoll & Rooney PC

(57) ABSTRACT

A vehicle cooling device includes a pump, circulation paths connected to the pump for circulating coolant between a cooling object and a heat exchanger, a solenoid valve for opening and closing at least one of the circulation paths, and a control unit for controlling pump operation. The solenoid valve includes a valve body movable between a position separated from a valve seat and a position abutting the valve seat, the valve body being held in abutment with the valve seat, and a solenoid maintaining the abutment when energized. The valve body allows coolant fluid pressure to move the valve body separate from the valve seat when the solenoid is not energized and the pump is in operation, and the control unit performs controlling to stop the pump and start solenoid energization when conditions are ready for stopping coolant circulation through the circulation path in which the solenoid valve is disposed.

9 Claims, 4 Drawing Sheets

(51) Int. Cl.

| | | |
|---|---|---|
| *F01N 5/02* | (2006.01) | |
| *F02M 31/08* | (2006.01) | |
| *F01P 7/00* | (2006.01) | |
| *F01P 5/12* | (2006.01) | |
| *F01P 7/16* | (2006.01) | |
| *F16K 15/02* | (2006.01) | |
| *F16K 15/18* | (2006.01) | |
| *F16K 31/06* | (2006.01) | |
| *F01P 7/14* | (2006.01) | |
| *F01P 3/02* | (2006.01) | |

(52) U.S. Cl.
CPC ............. *F16K 15/18* (2013.01); *F16K 31/0651* (2013.01); *F16K 31/0658* (2013.01); *F01P 2003/027* (2013.01); *F01P 2005/125* (2013.01); *F01P 2007/146* (2013.01)

(56) References Cited

U.S. PATENT DOCUMENTS

| | | | | |
|---|---|---|---|---|
| 2,501,709 | A * | 3/1950 | Booth | 165/51 |
| 2,695,012 | A * | 11/1954 | Brubaker | 123/41.08 |
| 3,358,654 | A * | 12/1967 | Shanahan et al. | 123/41.08 |
| 3,521,610 | A * | 7/1970 | Coudriet | 123/41.08 |
| 3,921,600 | A * | 11/1975 | Henning et al. | 123/41.08 |
| 4,237,923 | A | 12/1980 | Pressaco | |
| 4,319,547 | A * | 3/1982 | Bierling | 123/41.08 |
| 4,381,736 | A * | 5/1983 | Hirayama | 123/41.1 |
| 4,423,705 | A * | 1/1984 | Morita et al. | 123/41.29 |
| 4,455,972 | A * | 6/1984 | Kawakami | 123/41.29 |
| 4,759,316 | A * | 7/1988 | Itakura | 123/41.08 |
| 4,832,262 | A * | 5/1989 | Robertson | 165/52 |
| 4,875,437 | A * | 10/1989 | Cook et al. | 123/41.1 |
| 4,964,371 | A * | 10/1990 | Maeda et al. | 123/41.1 |
| 5,121,714 | A * | 6/1992 | Susa et al. | 123/41.1 |
| 5,255,733 | A * | 10/1993 | King | 165/41 |
| 5,353,753 | A * | 10/1994 | McGrath et al. | 123/73 AD |
| 5,353,757 | A * | 10/1994 | Susa et al. | 165/51 |
| 5,458,096 | A * | 10/1995 | Hollis | 123/41.1 |
| 5,503,118 | A * | 4/1996 | Hollis | 123/41.08 |
| 5,638,775 | A * | 6/1997 | Hollis | 123/41.08 |
| 5,657,722 | A * | 8/1997 | Hollis | 123/41.08 |
| 5,669,335 | A * | 9/1997 | Hollis | 123/41.1 |
| 5,699,760 | A * | 12/1997 | Yang et al. | 123/41.74 |
| 5,701,852 | A | 12/1997 | Suzuki et al. | |
| 6,044,808 | A * | 4/2000 | Hollis | 123/41.1 |
| 6,152,088 | A * | 11/2000 | Occella et al. | 123/41.1 |
| 6,330,910 | B1 * | 12/2001 | Bennett | 165/51 |
| 6,435,143 | B2 * | 8/2002 | Hollis | 123/41.1 |
| 6,955,141 | B2 * | 10/2005 | Santanam et al. | 123/41.08 |
| 7,036,745 | B2 * | 5/2006 | Bouloy et al. | 236/101 R |
| 7,077,776 | B2 * | 7/2006 | Sorab et al. | 165/51 |
| 7,243,620 | B2 * | 7/2007 | Takahashi | 123/41.44 |
| 7,267,084 | B2 * | 9/2007 | Lutze et al. | 123/41.02 |
| 8,042,609 | B2 * | 10/2011 | Samie et al. | 165/51 |
| 8,550,147 | B2 * | 10/2013 | Lansinger | 165/41 |
| 8,733,300 | B2 * | 5/2014 | Buchanan | 123/200 |
| 8,863,704 | B2 * | 10/2014 | Mehring et al. | 123/41.16 |
| 8,881,691 | B2 * | 11/2014 | Buchanan et al. | 123/3 |
| 2006/0076129 | A1 | 4/2006 | Eliades et al. | |
| 2006/0157000 | A1 * | 7/2006 | Lutze et al. | 123/41.44 |
| 2009/0025668 | A1 * | 1/2009 | Matsusaka et al. | 123/90.17 |
| 2011/0236230 | A1 * | 9/2011 | Ikegawa et al. | 417/316 |
| 2013/0020513 | A1 * | 1/2013 | Matsusaka et al. | 251/63.6 |
| 2013/0161547 | A1 * | 6/2013 | Matsusaka et al. | 251/129.15 |
| 2013/0161548 | A1 * | 6/2013 | Matsusaka et al. | 251/129.22 |
| 2013/0220243 | A1 * | 8/2013 | Matsusaka et al. | 123/41.01 |
| 2014/0137817 | A1 * | 5/2014 | Komuro et al. | 123/41.08 |

FOREIGN PATENT DOCUMENTS

| | | |
|---|---|---|
| DE | 103 54 230 A1 | 6/2005 |
| EP | 0 001 195 A1 | 3/1979 |
| JP | 6-323137 A | 11/1994 |
| JP | 9-158724 A | 6/1997 |
| JP | 10-103808 A | 4/1998 |
| JP | 2849791 B2 | 1/1999 |
| JP | 2000-303842 A | 10/2000 |
| JP | 2001-12245 A | 1/2001 |
| JP | 2006-37874 A | 2/2006 |
| JP | 2006-138307 A | 6/2006 |
| JP | 2006-524786 A | 11/2006 |
| JP | 4457848 B2 | 4/2010 |
| WO | WO 2004/097277 A1 | 11/2004 |

OTHER PUBLICATIONS

International Search Report (PCT/ISA/210) issued on Apr. 17, 2012, by the Japanese Patent Office as the International Searching Authority for International Application No. PCT/JP2012/050478.

Written Opinion (PCT/ISA/237) issued on Apr. 17, 2012, by the Japanese Patent Office as the International Searching Authority for International Application No. PCT/JP2012/050478.

U.S. Appl. No. 13/637,919, filed Sep. 27, 2012, Masanobu Matsusaka et al.

U.S. Appl. No. 13/821,698, filed Mar. 8, 2013, Masanobu Matsusaka et al.

U.S. Appl. No. 13/883,144, filed May 2, 2013, Masanobu Matsusaka et al.

The Extended European Search Report issued on Jan. 17, 2014, by the European Patent Office in corresponding European Patent Application No. 12744439.6-1606. (7 pages).

Office Action issued Feb. 12, 2015 in corresponding Chinese Patent Application No. 201280007913.5 (6 pages).

* cited by examiner

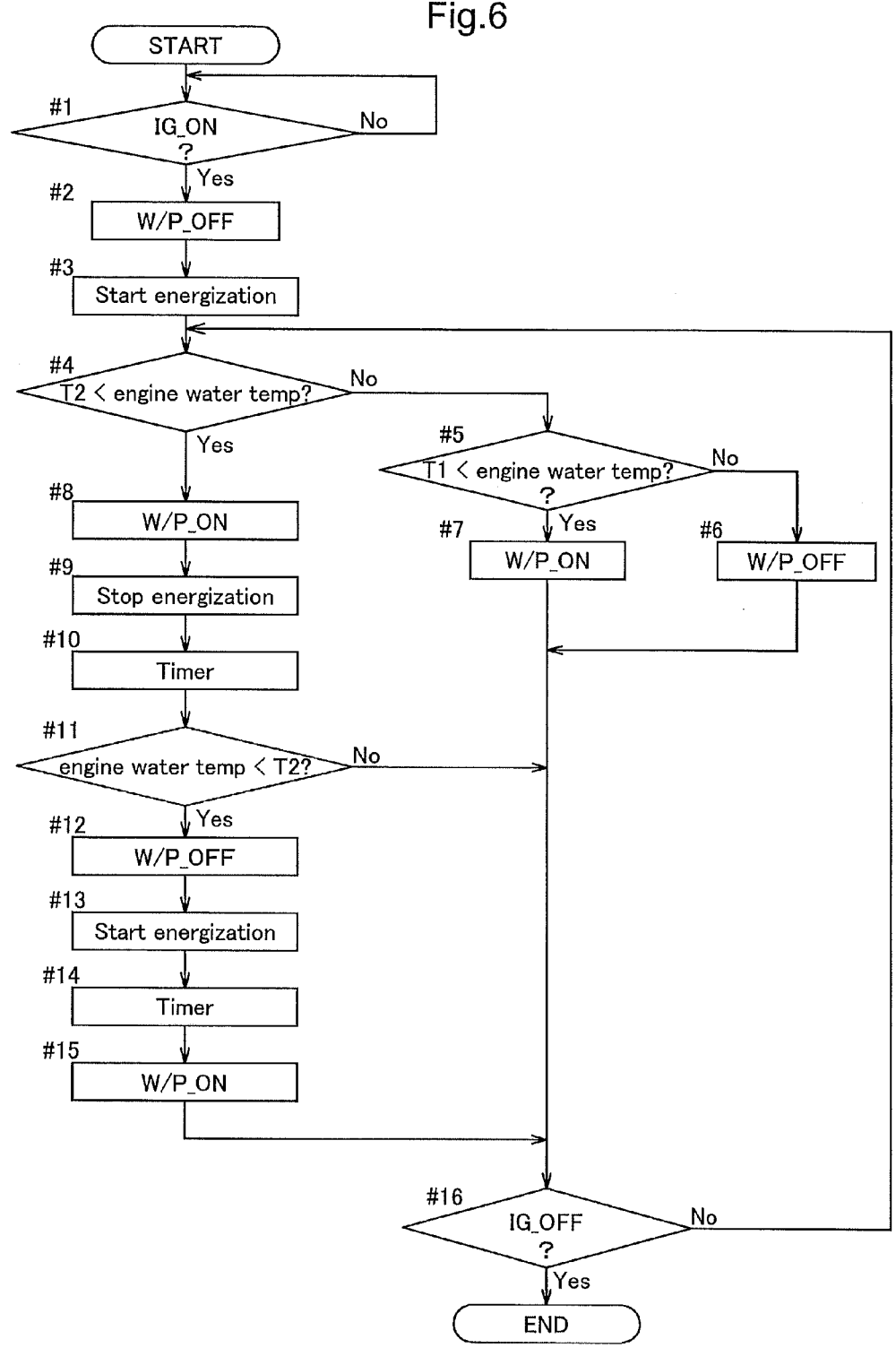

VEHICLE COOLING DEVICE

TECHNICAL FIELD

The present invention relates to a vehicle cooling device for use with the cooling system for an engine or the like.

BACKGROUND ART

A vehicle cooling device includes, for example, an electric pump, an engine as an object of cooling, a heat exchanger, a circulation path for circulation of coolant between the engine and the heat exchanger by the operation of the pump, and a solenoid valve capable of opening and closing the circulation path. This solenoid valve may be of the type in which the valve body is brought into abutment with the valve seat by the biasing force of a biasing member when the solenoid is not energized to switch the valve to a closed state, and the valve body is moved against the biasing force of the biasing member by the energization of the solenoid to switch the valve to an open state (see, for example, Patent Document 1). Accordingly, in order to circulate the coolant between the object of cooling and the heat exchanger, it is necessary to energize the solenoid to move the valve body against the biasing force of the biasing member and also to maintain the energized state.

CITATION LIST

Patent Document

Patent Document 1: JP 2849791 B (Paragraphs [0012]-[0013] and FIG. 4).

SUMMARY OF INVENTION

The conventional vehicle cooling device requires a solenoid valve with a large driving force achieved through solenoid energization to be able to move the valve body to an open position against the biasing force of the biasing member. This may result in upsizing of the unit.

Additionally, in order to circulate the coolant through the circulation paths, the energized state of the solenoid valve's solenoid needs to be maintained, thus potentially increasing the power consumption.

An object of the present invention, made in the light of the above circumstances, is to provide a vehicle cooling device that is easily downsizable and unlikely to increase power consumption.

A first configuration of the vehicle cooling device according to the present invention is characterized by comprising: a pump; a plurality of circulation paths connected to the pump for circulating coolant between a vehicle's object of cooling and a heat exchanger; a solenoid valve capable of opening and closing at least one of the plurality of circulation paths; and a control unit for controlling the operation of the pump; wherein the solenoid valve includes a valve body that is movable between a position in which the valve body is separated from a valve seat and a position in which the valve body is in abutment with the valve seat, the valve body being held in abutment with the valve seat, and a solenoid capable of maintaining the abutment between the valve body and the valve seat due to energization thereof; wherein the valve body is provided in a manner that allows the fluid pressure of the coolant to move the valve body to the position in which the valve body is separated from the valve seat when the solenoid is not energized and the pump is in operation; and wherein the control unit is configured to be able to perform controlling to stop the pump and start energization of the solenoid when determining that conditions are ready for stopping the circulation of the coolant through the circulation path in which the solenoid valve is disposed.

In the vehicle cooling device with this configuration, the solenoid valve includes a valve body that is movable between a position in which the valve body is separated from a valve seat and a position in which the valve body is in abutment with the valve seat, the valve body being held in abutment with the valve seat, and a solenoid capable of maintaining the abutment between the valve body and the valve seat due to energization thereof. Thus, it is possible to maintain the solenoid valve in a closed state with the valve body abutting against the valve seat by energization of the solenoid.

Additionally, the valve body is provided in a manner that allows the fluid pressure of the coolant to move the valve body to the position in which the valve body is separated from the valve seat when the solenoid is not energized and the pump is in operation. Accordingly, when the solenoid is not energized with the pump in operation, the fluid pressure of the coolant acts on the valve body to switch the solenoid valve to an open state and is capable of maintaining the open state.

For example, if a single cooling circulation path were connected to the pump, the pump could be stopped to shut off the circulation of the coolant through the cooling circulation path. However, if a plurality of cooling circulation paths is connected to the pump, the pump continues to operate even if conditions are ready for stopping the circulation of the coolant through the circulation path as long as the coolant needs to circulate through the other cooling circulation paths. This means that the coolant continues to circulate through the circulation paths that do not require cooling.

However, if a solenoid valve is disposed in the cooling circulation path that may be stopped, it is possible to selectively stop the circulation of the coolant by energizing the solenoid to close the solenoid valve. Since the pump is in operation, the valve body is still separated from the valve seat by the fluid pressure of the coolant. A solenoid that generates a large electromagnetic force is required to bring the valve body from this state into abutment with the valve seat.

However, in the vehicle cooling device with the above configuration, the control unit, which controls the operation of the pump, is configured to be able to perform controlling to stop the pump and start energization of the solenoid when determining that conditions are ready for stopping the circulation of the coolant through the circulation path in which the solenoid valve is disposed.

Accordingly, if there is a circulation path among the plurality of the paths for which the coolant circulation may be stopped when the water pump is in operation, the operation of the water pump is temporarily stopped so that the valve body is no longer subjected to the fluid pressure of the coolant. The solenoid is then energized to bring the valve body into abutment with the valve seat, thus placing the solenoid valve in the closed state.

That means that in the vehicle cooling device with this configuration, a compact solenoid valve with a small driving force and small power consumption can be reliably switched between the closed state by the energization of the solenoid and the open state by the fluid pressure of the coolant. This can facilitate downsizing and reduced power consumption of the vehicle cooling device. Furthermore, the solenoid valve may be switched to the closed state from the condition where the coolant is circulated through the plurality of cooling circulation paths connected to the pump. This stops unnecessary circulation of the coolant to a cooling circulation path and thus improves the fuel efficiency.

A second configuration of the vehicle cooling device according to the present invention is characterized in that the vehicle's object of cooling comprises a cylinder head and an engine block and the solenoid valve is disposed in the circulation path that circulates the coolant between the engine block and the heat exchanger.

If the vehicle's object of cooling includes a cylinder head and an engine block, coolant needs to be promptly circulated through the cylinder head since it reaches high temperatures in a short time after engine startup. The engine block, however, does not require prompt coolant circulation as the temperature of the engine block takes a longer time to rise than that of the engine head. Accordingly, if, as in this configuration, a solenoid valve is disposed in the circulation path that circulates the coolant between the engine block and the heat exchanger, the coolant can be promptly circulated through the cylinder head by pump operation and the coolant can be circulated through the engine block by not energizing of the solenoid of the solenoid valve in addition to the pump operation. This stops unnecessary coolant circulation through the engine block and improves the fuel efficiency.

A third configuration of the vehicle cooling device according to the present invention is characterized in that the control unit is configured to be able to perform controlling to restart the pump following a lapse of predetermined time after stoppage.

When the operation of the pump is temporarily stopped so as to close the solenoid valve disposed in one of the plurality of circulation paths, the temperatures are often high in the circulation paths and the like in which the solenoid valve is not disposed. Accordingly, it is preferable to minimize the time when the pump operation is stopped. If the pump is stopped, the solenoid valve is closed and the pump is subsequently restarted, for example, upon receiving a demand for restart for a plurality of circulation paths, handling the demand may take a long time or the pump may not restart due to a control error.

If however, as in this configuration, the control unit is configured to be able to perform controlling to restart the pump following a lapse of predetermined time after stoppage, it is ensured that the coolant circulation resumes to the one of the plurality of circulation paths for which coolant circulation is more crucial. In addition, by setting the predetermined time to the time required for the solenoid valve to be completely closed, the circulation of the coolant through the circulation path can be resumed more promptly.

A fourth configuration of the vehicle cooling device according to the present invention is characterized by comprising: a pump; a plurality of circulation paths connected to the pump for circulating coolant between a vehicle's object of cooling and a heat exchanger; a solenoid valve capable of opening and closing at least one of the plurality of circulation paths; and a control unit for controlling the operation of the pump; wherein the solenoid valve includes a valve body that is movable between a position in which the valve body is separated from a valve seat and a position in which the valve body is in abutment with the valve seat, the valve body being held in abutment with the valve seat, and a solenoid capable of maintaining the abutment between the valve body and the valve seat due to energization thereof; wherein the valve body is provided in a manner that allows the fluid pressure of the coolant to move the valve body to the position in which the valve body is separated from the valve seat when the solenoid is not energized and the pump is in operation; and wherein the control unit is configured to be able to perform controlling to start energization of the solenoid before the pump is started, when determining that conditions are ready for stopping the circulation of the coolant through the circulation path in which the solenoid valve is disposed.

In the vehicle cooling device with this configuration, the control unit, which controls the operation of the pump, is configured to be able to perform controlling to start energization of the solenoid before the pump is started, when determining that conditions are ready for stopping the circulation of the coolant through the circulation path in which the solenoid valve is disposed.

Accordingly, if there is a circulation path for which the coolant circulation may be stopped, the solenoid is energized to bring the valve body into abutment with the valve seat, thus placing the solenoid valve in the closed state, while the valve body is not subjected to the fluid pressure of the coolant before the pump is started.

This means that in the vehicle cooling device with this configuration, a compact solenoid valve with a small driving force and small power consumption can be reliably switched between the closed state by the energization of the solenoid and the open state by the fluid pressure of the coolant. This can facilitate downsizing and reduced power consumption of the vehicle cooling device.

BRIEF DESCRIPTION OF THE DRAWINGS

FIG. 2A is a vertical cross-section with the solenoid valve in its closed state and FIG. 2B is a vertical cross-section with the solenoid valve in its open state.

FIG. 6 is a control flowchart for the control unit of a third embodiment.

DESCRIPTION OF EMBODIMENTS

Embodiments of the present invention will be described hereinafter with reference to the drawings.

Figure 1:
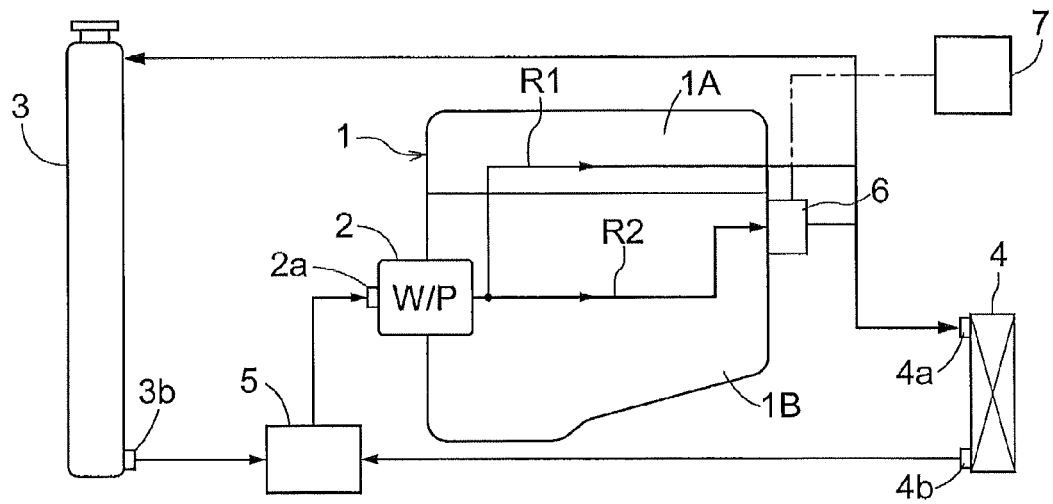
FIG. 1 is a schematic diagram depicting a vehicle cooling device.

FIG. 1 shows a vehicle cooling device according to the present invention. The vehicle cooling device includes a vehicle driving engine 1 having a cylinder head 1A and an engine block 1B, an electric water pump 2, heat exchangers, such as a radiator 3 and a heater core 4 for heating the cabin, a first circulation path R1, and a second circulation path R2. The first circulation path R1, through the operation of the water pump 2, provides for circulation of coolant between the cylinder head 1A of the engine 1 and the radiator 3 or the heater core 4. The second circulation path R2, through the operation of the water pump 2, provides for circulation of the coolant between the engine block 1B of the engine 1 and the radiator 3 or the heater core 4. The vehicle cooling device further includes a thermostatic valve 5 connected to the first circulation path R1 and the second circulation path R2, a solenoid valve 6 capable of opening and closing the second circulation path R2, and a control unit 7 that controls the operation of the water pump 2.

The thermostatic valve 5 is connected in the part of the circulation path located between the coolant outlet port 3b of the radiator 3 and the coolant inlet port 2a of the water pump 2. Accordingly, the coolant flow volume in the circulation path from the engine 1 (the cylinder head 1A and the engine block 1B) to the radiator 3 is controlled according to the degree of opening of the thermostatic valve 5. The coolant outlet port 4b of the heater core 4 is connected to the coolant inlet port 2a of the water pump 2 via a flow path (not shown) formed in the housing of the thermostatic valve 5.

Figure 2A:
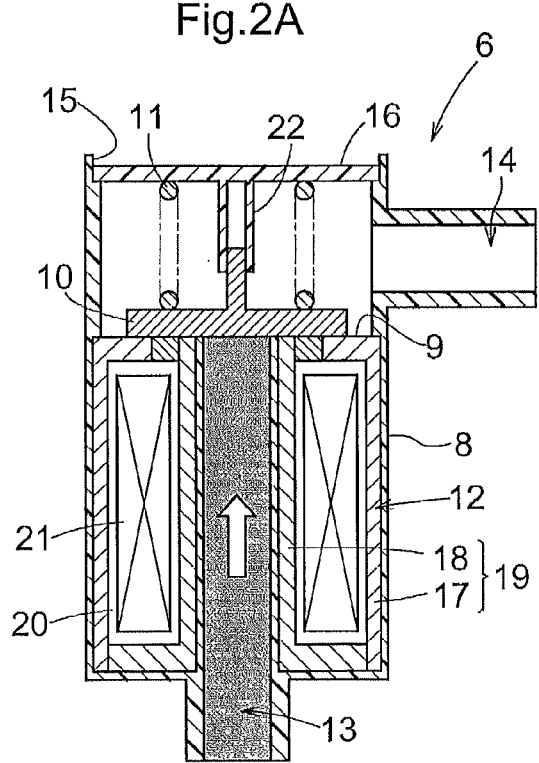
FIG. 2A and FIG. 2B show solenoid valve.
Figure 2B:
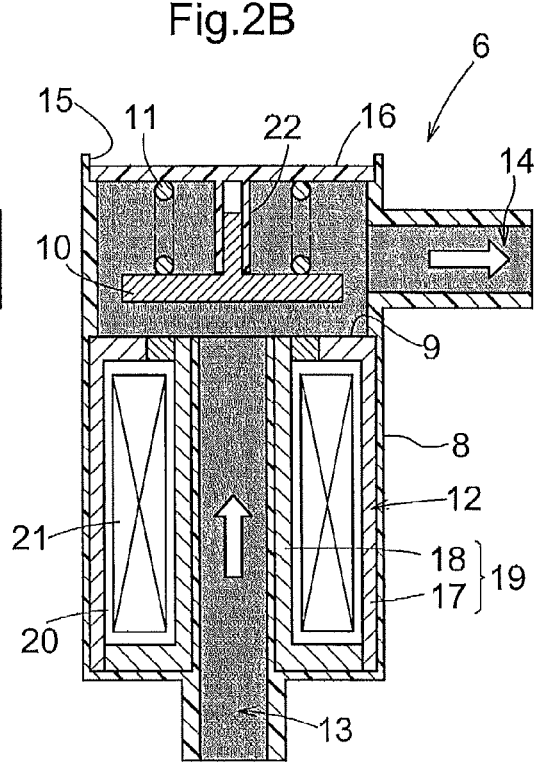

The solenoid valve 6 is connected to the second circulation path R2 adjacent to the coolant outlet port (not shown) of the engine block 1B. FIG. 2A shows the solenoid valve 6 in its closed state and FIG. 2B shows the solenoid valve 6 in its open state. The solenoid valve 6 includes a housing 8, a valve body 10 supported so as to be movable between a position in which the valve body is separated from a valve seat 9 and a position in which the valve body is in abutment with the valve seat 9, a biasing member 11 that biases and holds the valve body 10 in abutment with the valve seat 9, and a solenoid 12 capable of maintaining the abutment between the valve body 10 and the valve seat 9 due to energization thereof.

The housing 8 includes a coolant inlet passage 13, a coolant outlet passage 14, an opening 15 formed concentrically with and opposite to the coolant inlet passage 13, and a cover 16 that seals the opening 15. The coolant outlet passage 14 is disposed orthogonally with respect to the coolant inlet passage 13.

The solenoid 12 is electrically connected to a drive circuit via a connector (not shown) and includes a body 19 formed of a magnetic material, such as iron, in a double tube configuration with an outer diametric portion 17 and an inner diametric portion 18, a bobbin 20 made of an insulating material concentrically fitted inside the body 19, and an insulated copper wire 21 wound around the bobbin 20. The body 19 is fitted in the housing 8 in such a manner that the coolant passage 13 is arranged concentrically inside of the inner diametric portion 18.

The valve seat 9 is formed on the end of the body 19 that faces the cover 16. The valve body 10 is supported, for example, by a cylindrical bearing 22 formed, for example, on the cover 16 so as to be movable between a position in which the valve body 10 is separated from the valve seat 9 and a position in which the body is in abutment with the valve seat 9. The biasing member 11, which holds the valve body 10 in abutment with the valve seat 9, is made of a compression coil spring fitted between the cover 16 and the valve body 10.

The valve body 10 is made of a magnetic material, such as iron, so that when the solenoid 12 is magnetized by energization, the valve body 10 is pulled to the valve seat 9 formed on the body 19, thus placing the valve in the closed state, where the valve body 10 is maintained in abutment with the valve seat 9. When the solenoid 12 is not energized, the biasing force of the compression coil spring (biasing member) 11 maintains the valve body 10 in abutment with the valve seat 9.

Accordingly, when the water pump 2 is in operation with the solenoid 12 not energized, the fluid pressure of the coolant flowing into the coolant inlet passage 13 causes the valve body 10 to move to the position separated from the valve seat 9 against the biasing force of the compression coil spring 11, thus placing the solenoid valve 6 in the open state. As a result, the coolant flows out of the coolant outlet passage 14 and enters the coolant inlet port 4a of the heat core 4.

The water pump 2 is provided to carry the coolant through the first circulation path R1 and the second circulation path R2. In this embodiment, the first circulation path R1 and the second circulation path R2 have a shared flow-path portion and the water pump 2 is disposed near the coolant inlet port of the engine 1 in the shared portion. Moreover, since it is an electric pump, the water pump 2 can be operated independently from the operating conditions of the engine 1. Accordingly, even when the engine 1 is stopped, by operating the water pump 2, the coolant may be carried through the first circulation path R1 or both the first circulation path R1 and the second circulation path R2.

The control unit 7, for example, receives signals from a water temperature sensor (not shown) disposed near the coolant outlet port of the cylinder block 1A to control the operation of the water pump 2 and the solenoid valve 6. The controlling operation performed by the control unit 7 will be hereafter described with reference to FIGS. 3 and 4.

Figure 4:
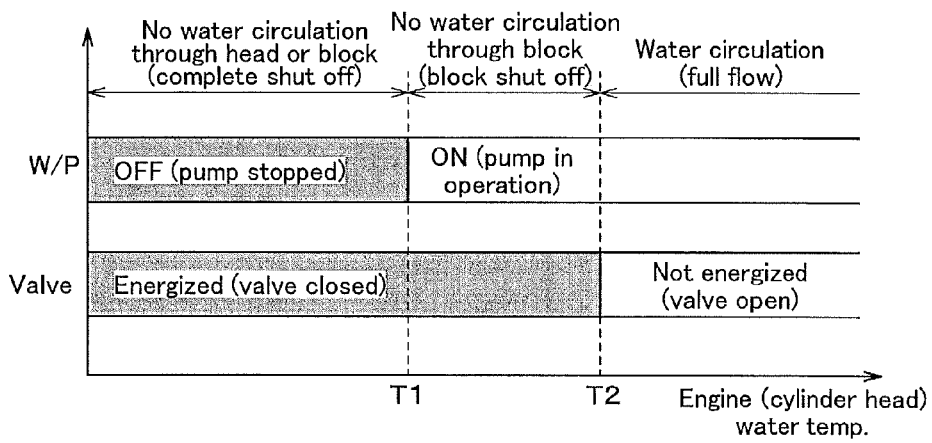
FIG. 4 is a chart relating an engine water temperature and the operating states of a pump and the solenoid valve.

FIG. 4 shows the relationship between the water temperature in the cylinder head 1A of the engine 1 ("the engine water temperature" hereafter) and the operation of the water pump 2 and the solenoid valve 6. As shown in FIG. 4, when the engine water temperature is below temperature T1, the water pump 2 is stopped and the solenoid valve 6 is in the closed state. Accordingly, no coolant is supplied to either the cylinder head 1A or the cylinder block 1B of the engine 1 (complete shutoff).

When the engine water temperature is above temperature T1 and below temperature T2, the water pump 2 is placed in operation and the solenoid 12 is energized to maintain the solenoid valve 6 in the closed state. Accordingly, of the cylinder head 1A and the engine block 1B of the engine 1, the coolant is supplied only to the cylinder head 1A ("block shutoff").

When the engine water temperature further rises to exceed temperature T2, the solenoid is no longer energized, thus placing the solenoid valve 6 in the open state. Accordingly, the coolant is supplied to both of the cylinder head 1A and the cylinder block 1B of the engine 1 (full flow).

Figure 3:
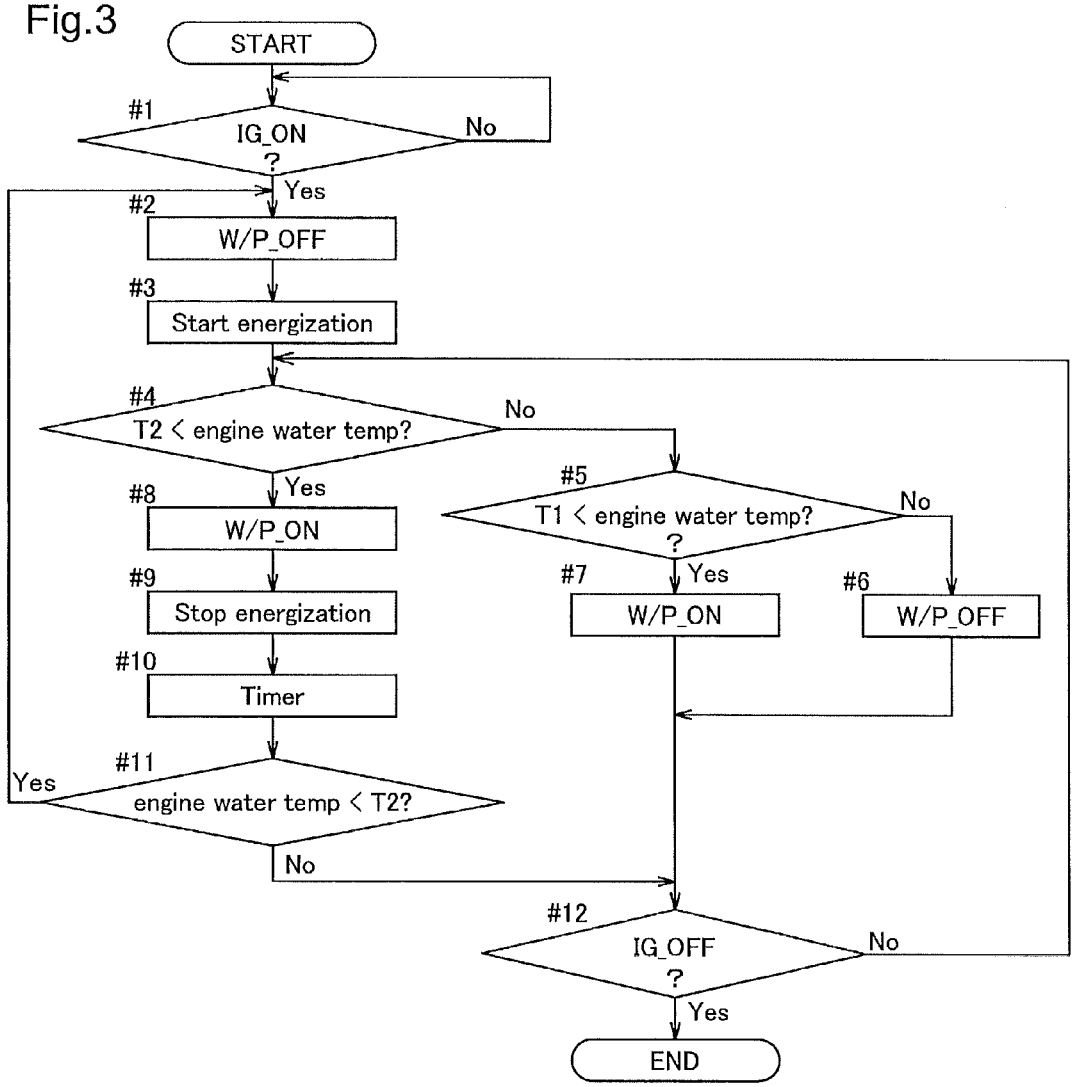
FIG. 3 is a control flowchart for a control unit.

As shown in the flowchart of FIG. 3, after the ignition key is inserted into the key cylinder and the ignition turned on (Step #1), initially, the water pump 2 remains stopped (Step #2) and energization of the solenoid 12 of the solenoid valve 6 is started (Step #3). This energization of the solenoid 12 causes the valve body 10 to be pulled to the valve seat 9, thus switching the solenoid valve to the closed state, in which the valve body 10 remains in abutment with the valve seat 9.

Next, it is determined whether or not the engine water temperature is above the predetermined temperature(s) (T1, T2 (T1<T2)) to accordingly control the operation of the water pump 2 and the solenoid 12.

If the engine temperature is below T1, it is determined at Step #4 that the engine temperature is below T2 (No), and it is determined at Step #5 that the engine temperature is below T1 (No), thus stopping the water pump 2 (Step #6). Accordingly, since the water pump 2 is stopped, no coolant is circulated through either the first circulation path R1 in the cylinder head 1A or the second circulation path R2 in the engine block 1B (complete shutoff).

If the engine temperature is above T1 and below T2, it is determined at Step #4 that the engine temperature is below T2 (No), and it is determined at Step #5 that the engine temperature is above T1 (Yes), thus placing the water pump 2 in operation (Step #7). This means that the water pump 2, now in operation, causes the coolant to circulate through the first circulation path R1 in the cylinder head 1A. However, no coolant circulates through the second circulation path R2 in the engine block 1B since the solenoid 12 is energized to maintain the closed state of the solenoid valve 6 (block shutoff).

If the engine temperature exceeds T2, it is determined at Step #4 that the engine temperature is above T2 (Yes), the water pump 2 is placed in operation (Step #8) and the energization of the solenoid 12 is stopped (Step #9). This results in the fluid pressure opening the solenoid valve 6, thereby circulating the coolant through both the first circulation path R1 in the cylinder head 1A and the second circulation path R2 in the engine block 1B (full flow).

If this full flow state, i.e., the state in which the engine water temperature is above T2, transitions to the state in which the temperature is below T2, it is determined at Step #11, following a lapse of a predetermined time (Step #10) after the solenoid valve 6 is opened at Step #9, that the engine temperature is below T2 (Yes) (i.e., it is determined that conditions are ready for stopping the coolant circulation through the second circulation path R2), and the process returns immediately upstream of Step #2. Subsequently, the water pump 2 is stopped (Step #2) and energization of the solenoid 12 is started (Step #3), thereby placing the solenoid valve 6 in the closed state again. Next, at Steps #4 and #5, the engine water temperature is compared to T1 and T2 again so as to control the operation of the water pump 2 and the solenoid valve 6. For example, if the engine temperature is maintained above T1 and below T2, it is determined at Step #4 that the engine temperature is below T2 (No) and also at Step #5 that the engine temperature is above T1 (Yes), thus placing the water pump 2 in operation (Step #7). This results in the "block shutoff" state, in which the coolant circulates through the first circulation path R1 but not through the second circulation path R2.

As described above, in the vehicle cooling device with this configuration, the control unit 7, which controls the operation of the water pump 2, is configured to be able to perform controlling to stop the water pump 2 and start energizing the solenoid 12 when conditions are ready for stopping the coolant circulation through the second circulation path R2 in the engine block 1B, where the solenoid valve 6 is disposed. Accordingly, if there is a circulation path among the plurality of the paths for which the coolant circulation may be stopped when the water pump 2 is in operation, it is possible to temporarily stop the operation of the water pump 2 so that the valve body 10 is no longer subjected to the fluid pressure of the coolant and then start energization of the solenoid 12 so as to bring the valve body 10 into abutment with the valve seat 9, thus placing the solenoid valve 6 in the closed state. In this way, when the coolant no longer needs to circulate through the engine block 1B via the second circulation path R2, the solenoid valve 6 can be switched to the closed state to stop the coolant circulation through the second circulation path R2, thereby improving the fuel efficiency.

Embodiment 2

Figure 5:
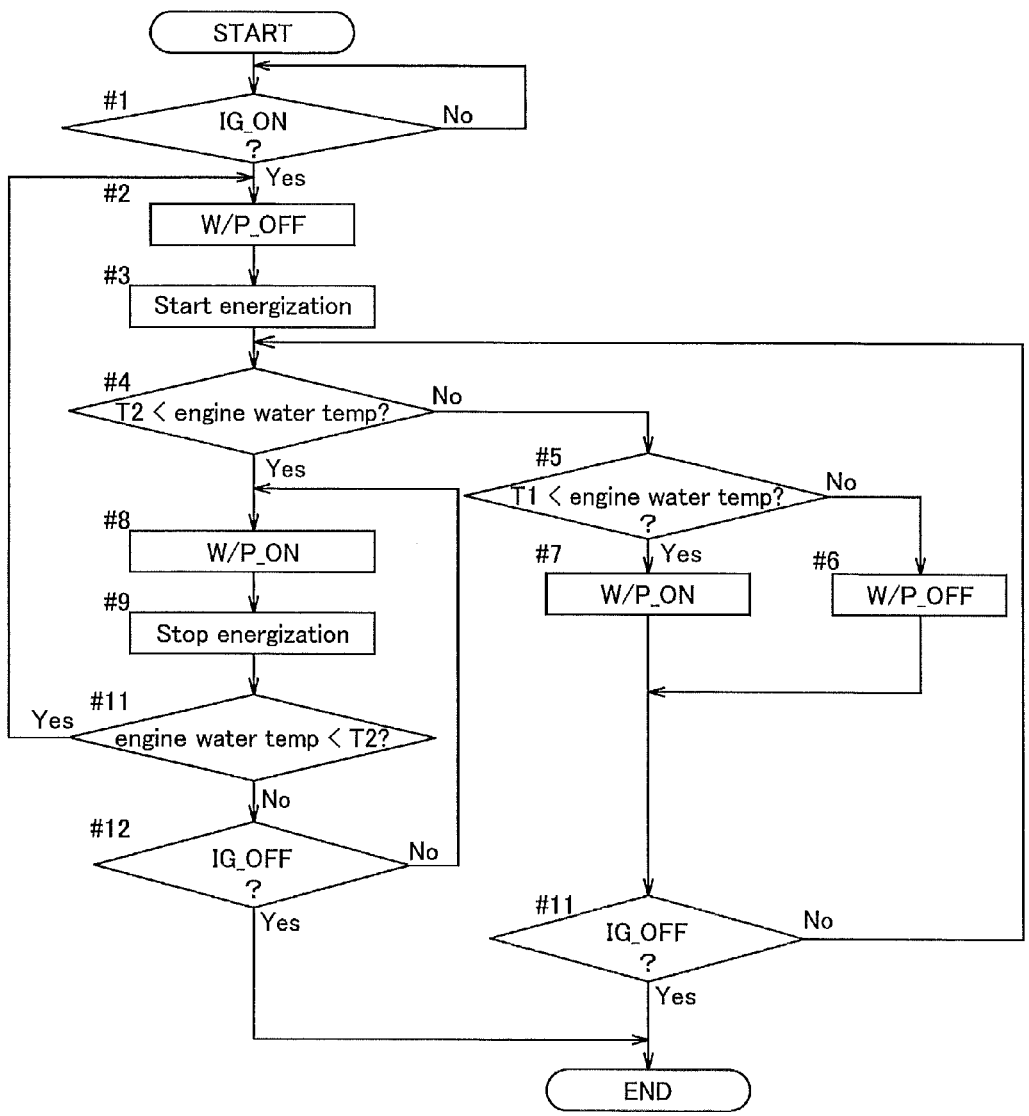
FIG. 5 is a control flowchart for the control unit of a second embodiment.

FIG. 5 is a flowchart showing the control operation performed according to another embodiment of the present invention. This embodiment differs from Embodiment 1 in omitting the step of predetermined time lapse processing after the determination by the control unit 7 at Step #4 that the engine temperature is above T2 (Yes) to subsequently place the water pump 2 in operation and stop energizing the solenoid 12 (Steps #8 and #9).

According to this embodiment, if it is determined at Step #10 that the engine water temperature is above T2 (No) and if it is determined at Step #11 that the ignition is turned on, the process returns immediately upstream of Step #8, subsequently repeating Steps #8, #9, #10, and #12 unless the engine water temperature falls below T2. If the engine water temperature falls below T2, it is determined at Step #10 that the engine water temperature is below T2 (Yes) (i.e., it is determined that conditions are ready for stopping the coolant circulation through the second circulation path R2), whereupon the water pump 2 is stopped (Step #2) and the solenoid 12 is energized (Step #3) to close the solenoid valve 6 again. The process flow is otherwise identical with Embodiment 1.

Embodiment 3

FIG. 6 is a flowchart showing the control operation performed according to still another embodiment of the present invention. Also in this embodiment, the control unit 7 determines at Step #4 that the engine water temperature is above T2 (Yes) to subsequently place the water pump 2 in operation and stop energizing the solenoid 12 (Steps #8 and #9), and after that the control unit 7 also determines at Step #11 that the engine water temperature is above T2 (Yes). The present embodiment differs from Embodiment 1 in that the process following Step #11 is carried out in a separate routine.

If it is determined at Step #11 that the engine water temperature is below T2 (Yes) (i.e., it is determined that conditions are ready for stopping the coolant circulation through the second circulation path R2), the water pump 2 is stopped (Step #12) and energization of the solenoid 12 is started (Step #13) to close the solenoid valve 6. After a lapse of a predetermined time (Step #14), the water pump 2 is placed in operation (Step #15). Subsequently, if it is determined that the ignition is turned on (Step #16), the engine water temperature is compared to T1 and T2 again at Steps #4 and #5 to control the operation of the water pump 2 and the solenoid valve 6. The process flow is otherwise identical with Embodiment 1.

If in this configuration, the control unit 7 is configured to be able to perform controlling to restart the water pump 2 following a lapse of predetermined time after stopping the water pump 2, it is ensured that the coolant circulation resumes to the first circulation path R1, i.e., the one of the circulation paths R1 and R2 for which coolant circulation is more crucial. In addition, by setting the predetermined time to the time required for the solenoid valve 6 to be completely closed, the circulation of the coolant through the second circulation path R2 can be promptly resumed.

Other Embodiments (1) In the vehicle cooling device of the present invention, it is also possible to dispose the solenoid valve 6 in the first circulation path R1, which circulates the coolant between the cylinder head 1A and the radiator 3.

(2) In the foregoing embodiments, the vehicle cooling device of the present invention has been described with respect to an exemplary vehicle's object of cooling that includes two systems, that is, the cylinder head 1A and the engine block 1B of the engine. However, two systems, such as the engine and the EGR cooler, the engine and the supercharger cooling system, or the engine and the heater circuit, may also be the vehicle's object of cooling by the vehicle cooling device according to the present invention. Furthermore, the vehicle cooling device of the present invention may be constituted by three or more systems with any combination of the aforementioned systems.

(3) In the foregoing embodiments, a water temperature sensor disposed on the cylinder head 1A of the engine 1 is used as a detector to stop the operation of the water pump 2 and start the energization of the solenoid 12. The water temperature sensor may be replaced with a pressure sensor disposed in the first circulation path R1 for detecting the vapor pressure of the coolant. In this case, the pressure sensor may cause the water pump 2 to become operational upon detection of a vapor pressure above a first predetermined value and also stop energization of the solenoid 6 so as to open the solenoid valve upon detection of a vapor pressure above a second predetermined value. Moreover, the engine speed or the heater switch conditions may be used for carrying out control depending on the vehicle's object of cooling.

(4) In the foregoing embodiments, examples of using a motor water pump 2 is described. Instead of the motor water pump 2, however, a water pump driven by the rotational force of the engine 1 transmitted thereto may be employed, provided that it is a variable water pump capable of switching the engine's rotational force between a transmittable mode and a non-transmittable mode.

INDUSTRIAL APPLICABILITY

The vehicle cooling device according to the present invention may be used as a cooling unit for a wide range of objects of cooling in various types of vehicles.

The invention claimed is:

1. A vehicle cooling device, comprising:
   a pump;
   a plurality of circulation paths connected to the pump for circulating coolant between a vehicle's object of cooling and a heat exchanger, the vehicle's object of cooling comprising a cylinder head and an engine block;
   a solenoid valve disposed in one of the plurality of circulation paths that circulates the coolant between the engine block and the heat exchanger, the solenoid valve being configured to open and close the at least one of the plurality of circulation paths;
   a control unit for controlling the operation of the pump and the solenoid;
   wherein the solenoid valve includes a valve body that is movable between a position in which the valve body is separated from a valve seat and a position in which the valve body is in abutment with the valve seat, and a solenoid configured to maintain the abutment between the valve body and the valve seat due to energization of the solenoid;
   wherein the valve body is provided in a manner that allows the fluid pressure of the coolant to move the valve body to the position in which the valve body is separated from the valve seat when the solenoid is not energized and the pump is in operation;
   wherein the control unit is configured to stop the pump and to start energization of the solenoid when determining that conditions are ready for stopping the circulation of the coolant through the circulation path in which the solenoid valve is disposed;
   wherein when the pump is in operation and the solenoid is energized to maintain the solenoid valve in a closed state, the coolant is supplied to the cylinder head and the coolant is not supplied to the engine block;
   wherein the solenoid comprises a solenoid body made of a magnetic material and a circulation passage passing through the solenoid body, and arranged concentrically with the solenoid body, the circulation passage communicating with the one of the plurality of circulation paths that circulates the coolant between the engine block and the heat exchanger;
   wherein the valve seat is provided on the solenoid body;
   wherein the valve body of the solenoid is made of a magnetic material so that the valve body is pulled to the valve seat when the solenoid is energized; and
   wherein an end face of the valve seat is a planar surface that is perpendicular to a direction of a fluid pressure of the coolant acting on the valve body.

2. The vehicle cooling device according to claim 1, wherein the control unit is configured to restart the pump following a lapse of a predetermined period after stoppage.

3. The vehicle cooling device according to claim 1, wherein the solenoid body is cylindrically shaped, and the circulation passage extends concentrically inside the solenoid body.

4. A vehicle cooling device, comprising:
   a pump;
   a plurality of circulation paths connected to the pump for circulating coolant between a vehicle's object of cooling and a heat exchanger, the vehicle's object of cooling comprising a cylinder head and an engine block;
   a solenoid valve disposed in one of the plurality of circulation paths that circulates the coolant between the engine block and the heat exchanger, the solenoid valve being configured to open and close the at least one of the plurality of circulation paths; and
   a control unit for controlling the operation of the pump and the solenoid;
   wherein the solenoid valve includes a valve body that is movable between a position in which the valve body is separated from a valve seat and a closed position in which the valve body is in abutment with the valve seat, and a solenoid configured to maintain the abutment between the valve body and the valve seat due to energization of the solenoid;
   wherein the valve body is provided in a manner that allows the fluid pressure of the coolant to move the valve body to the position in which the valve body is separated from the valve seat when the solenoid is not energized and the pump is in operation;
   wherein the control unit is configured to start energization of the solenoid before the pump is started, when determining that conditions are ready for stopping the circulation of the coolant through the circulation path in which the solenoid valve is disposed;
   wherein when the pump is in operation and the solenoid is energized to maintain the solenoid valve in a closed state, the coolant is supplied to the cylinder head and the coolant is not supplied to the engine block;
   wherein the solenoid comprises a solenoid body made of a magnetic material and a circulation passage passing through the solenoid body, and arranged concentrically with the solenoid body, the circulation passage communicating with the one of the plurality of circulation paths that circulates the coolant between the engine block and the heat exchanger;
   wherein the valve seat is provided on the solenoid body;
   wherein the valve body of the solenoid is made of a magnetic material so that the valve body is pulled to the valve seat when the solenoid is energized; and
   wherein an end face of the valve seat is a planar surface that is perpendicular to a direction of a fluid pressure of the coolant acting on the valve body.

5. The vehicle cooling device according to claim 4, wherein the control unit is configured to restart the pump following a lapse of a predetermined period after stoppage of the pump.

6. The vehicle cooling device according to claim 4, wherein the solenoid body is cylindrically shaped, and the circulation passage extends concentrically inside the solenoid body.

7. A vehicle cooling device, comprising:
   a pump;
   a first circulation path connected to the pump for circulating coolant between a cylinder head of the vehicle and a heat exchanger, and a second circulation path connected to the pump for circulating coolant between an engine block of the vehicle and the heat exchanger;

a solenoid valve disposed in the second circulation path to open and close the second circulation path;

a control unit configured to control operation of the pump and the solenoid;

the solenoid valve including a valve body movable between a position in which the valve body is separated from a valve seat and a position in which the valve body is in abutment with the valve seat, and a solenoid configured to be energized to maintain the abutment between the valve body and the valve seat;

the valve body being configured to be moved away from the valve seat by fluid pressure of the coolant when the solenoid is not energized and the pump is in operation to separate the valve body from the valve seat;

wherein when the pump is in operation and the solenoid is energized so that the valve body is in abutment with the valve seat in a closed state of the solenoid valve, the coolant is supplied to the cylinder head but is not supplied to the engine block;

the control unit being configured to stop the operation of the pump and start energization of the solenoid when it is determined that conditions are ready for stopping the circulation of the coolant through the second circulation path;

wherein the solenoid comprises a solenoid body made of a magnetic material and a circulation passage passing through the solenoid body, and arranged concentrically with the solenoid body, the circulation passage communicating with the second circulation path;

wherein the valve seat is provided on the solenoid body;

wherein the valve body of the solenoid is made of a magnetic material so that the valve body is pulled to the valve seat when the solenoid is energized; and wherein an end face of the valve seat is a planar surface that is perpendicular to a direction of a fluid pressure of the coolant acting on the valve body.

8. The vehicle cooling device according to claim 7, wherein the control unit is configured to restart the pump following a lapse of a predetermined period after stoppage of the pump.

9. The vehicle cooling device according to claim 7, wherein the solenoid body is cylindrically shaped, and the circulation passage extends concentrically inside the solenoid body.

\* \* \* \* \*